Feb. 21, 1967     J. MAURICE     3,305,051
BRAKING DEVICE, ESPECIALLY FOR AUTOMOTIVE VEHICLES
Filed Jan. 13, 1965     11 Sheets-Sheet 2
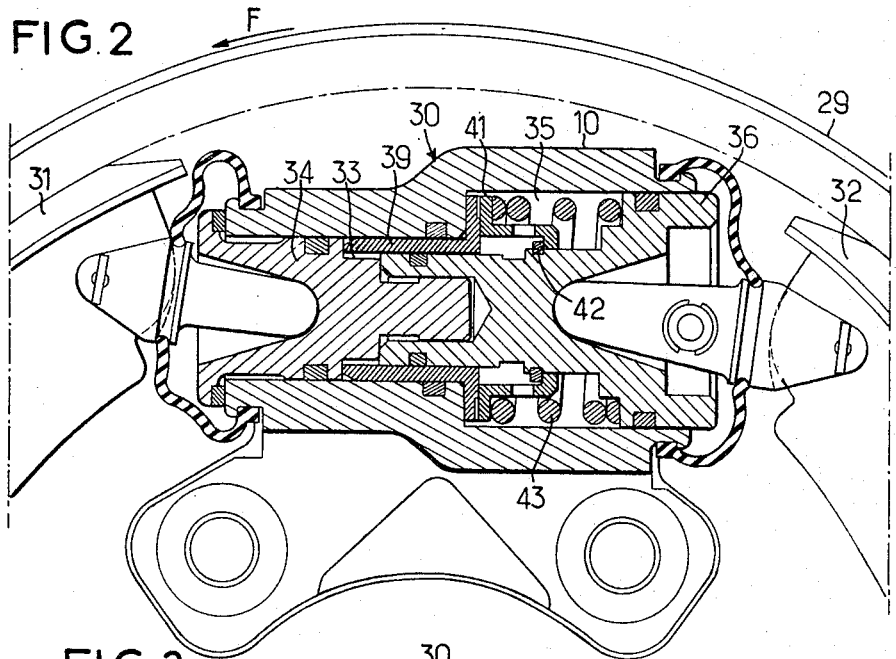
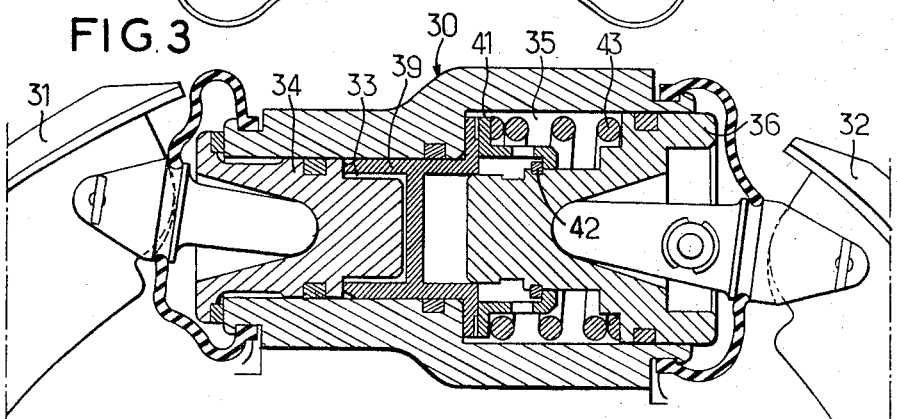
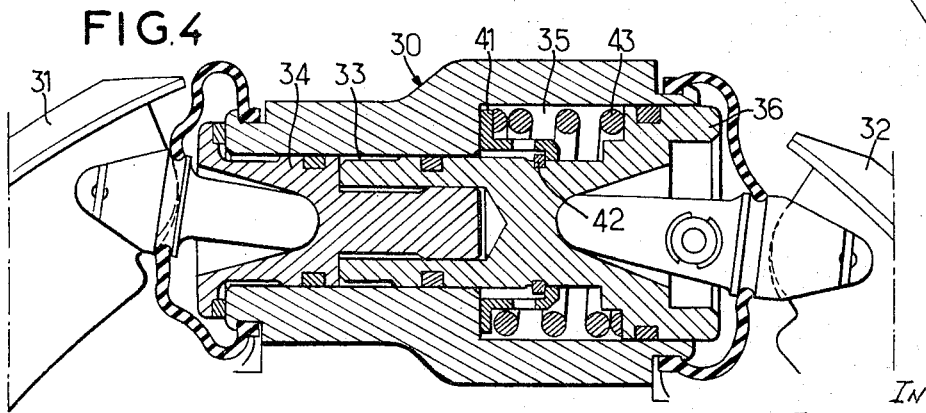
INVENTOR
JEAN MAURICE
By Irwin S. Thompson
ATTORNEY

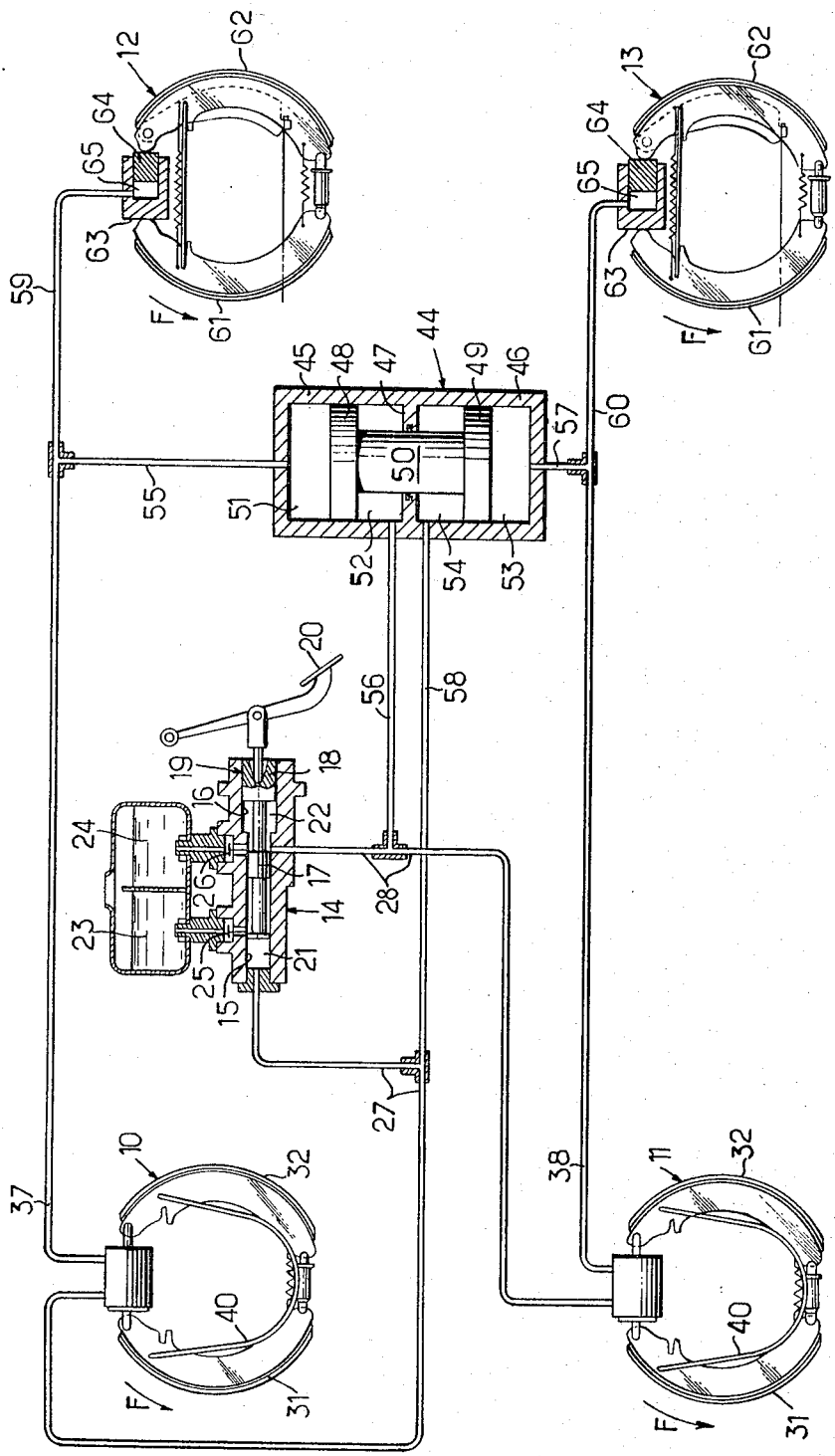

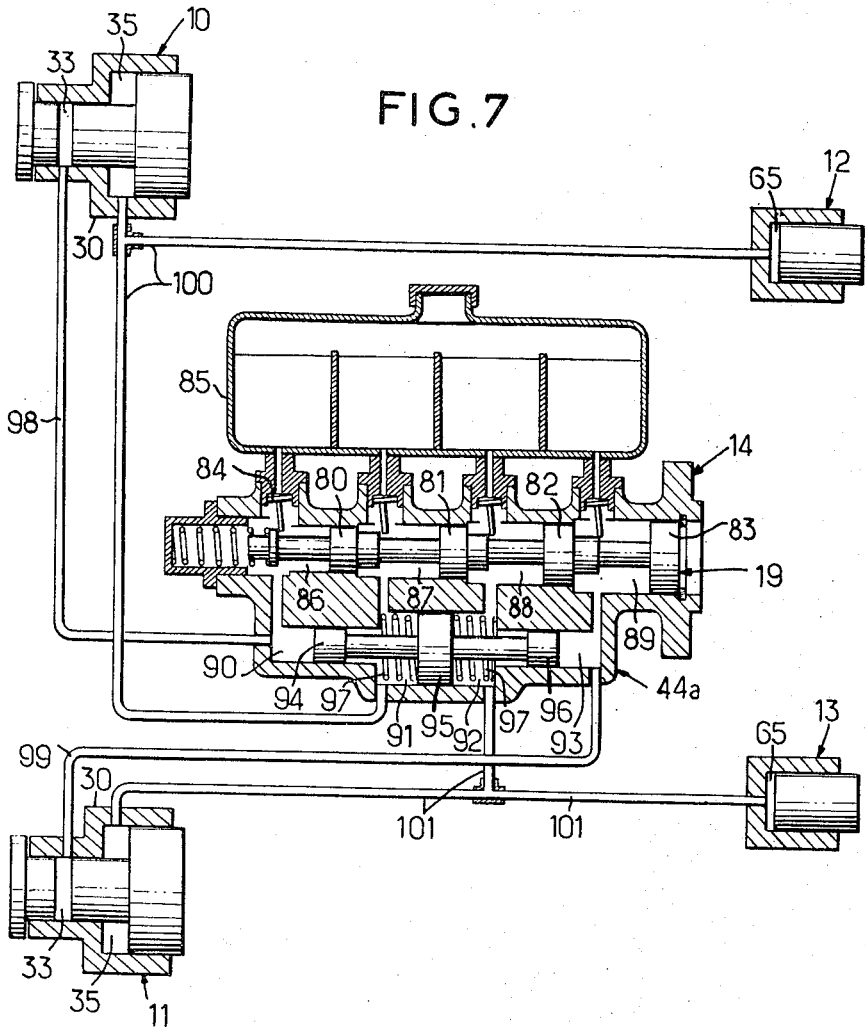
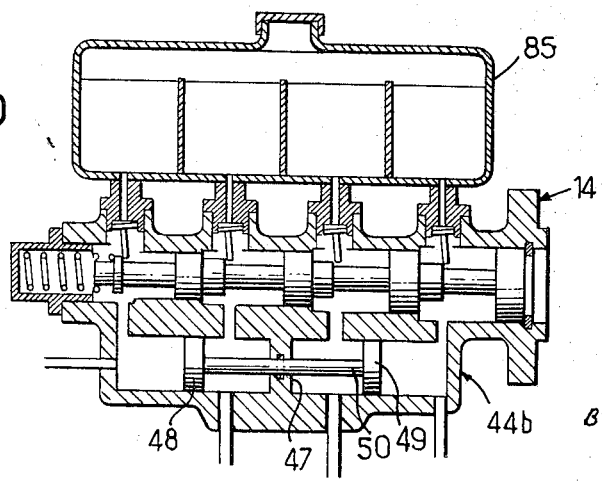

INVENTOR
JEAN MAURICE
By Irvin S. Thompson
ATTORNEY

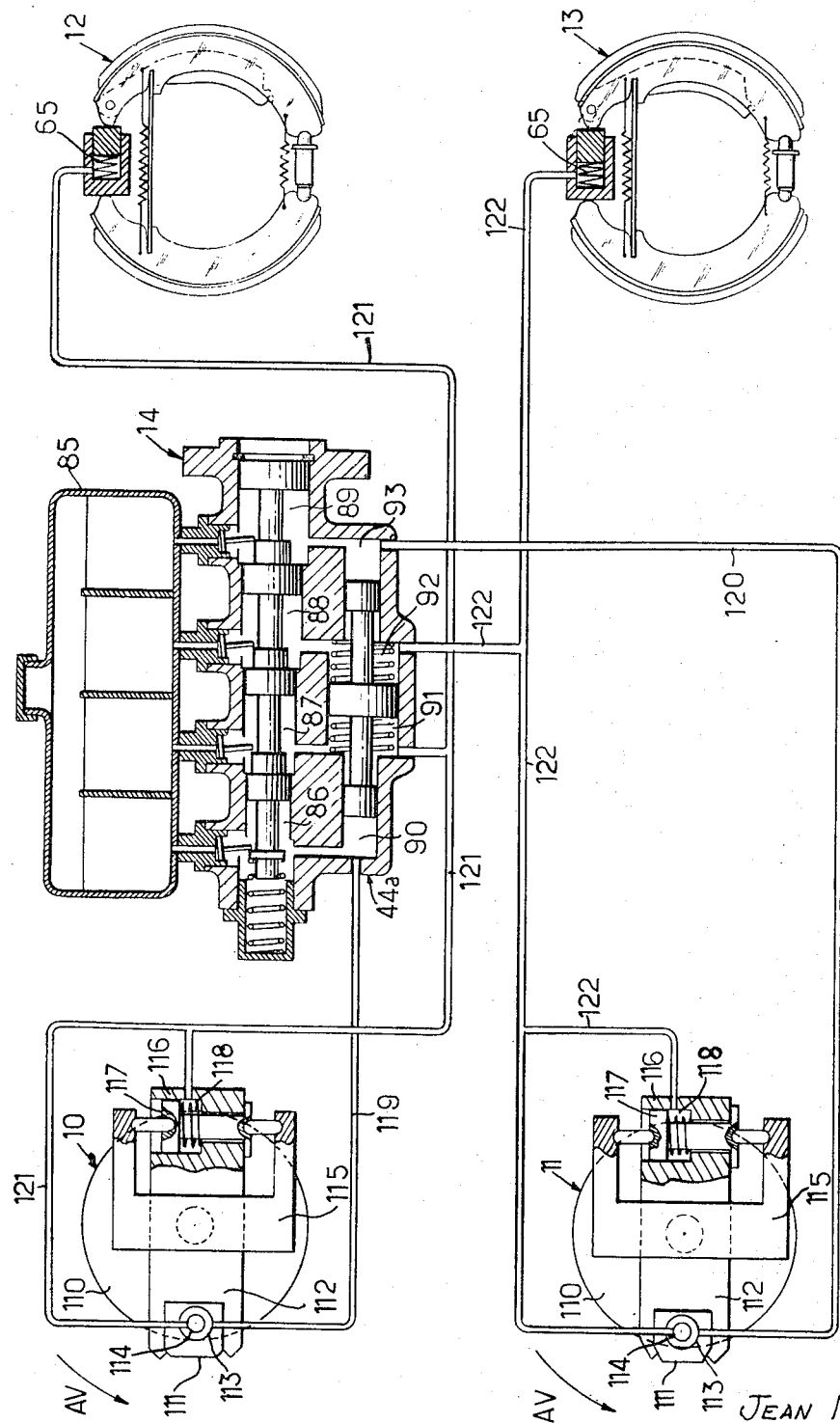

INVENTOR
JEAN MAURICE
BY Irvin S. Thompson
ATTORNEY

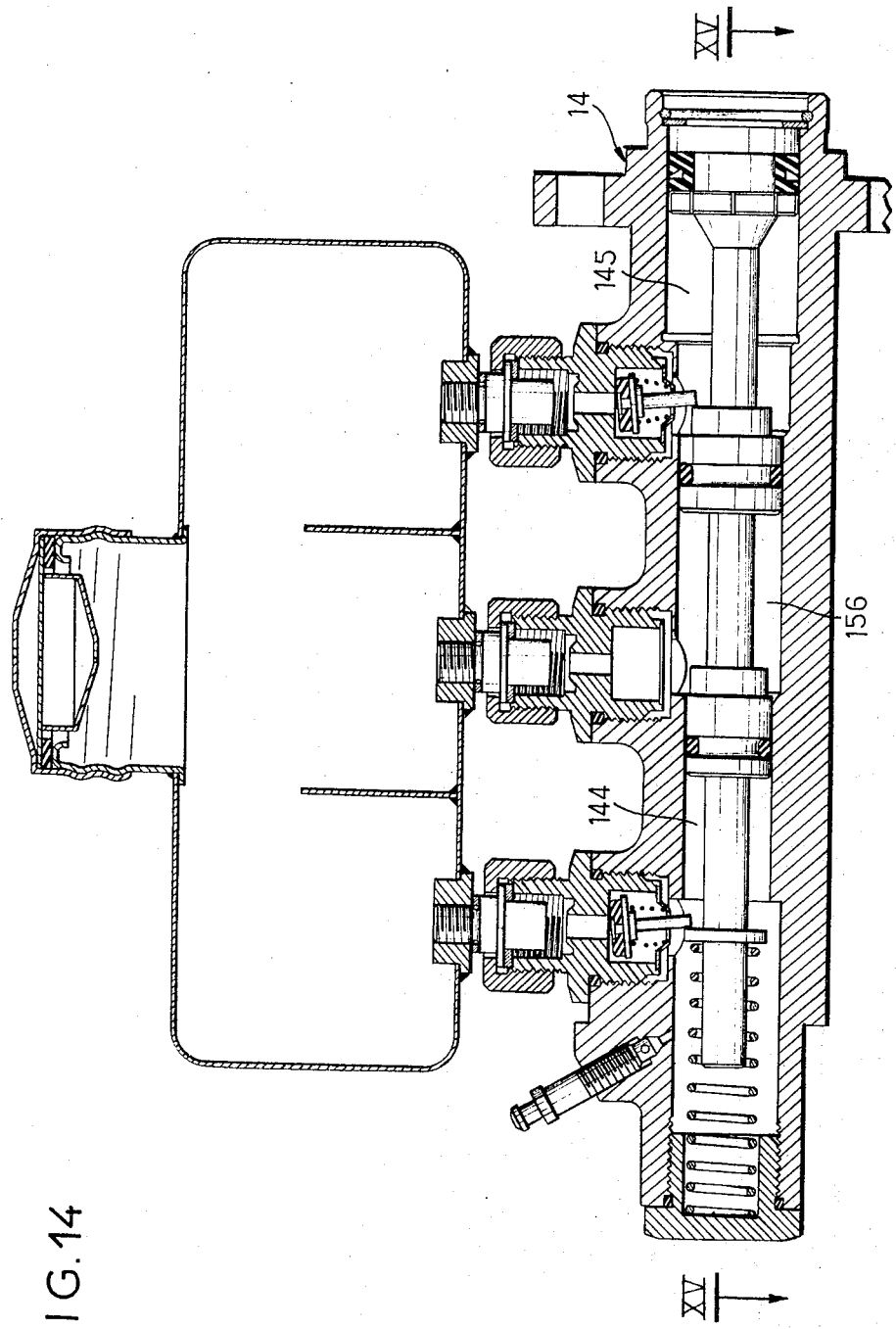

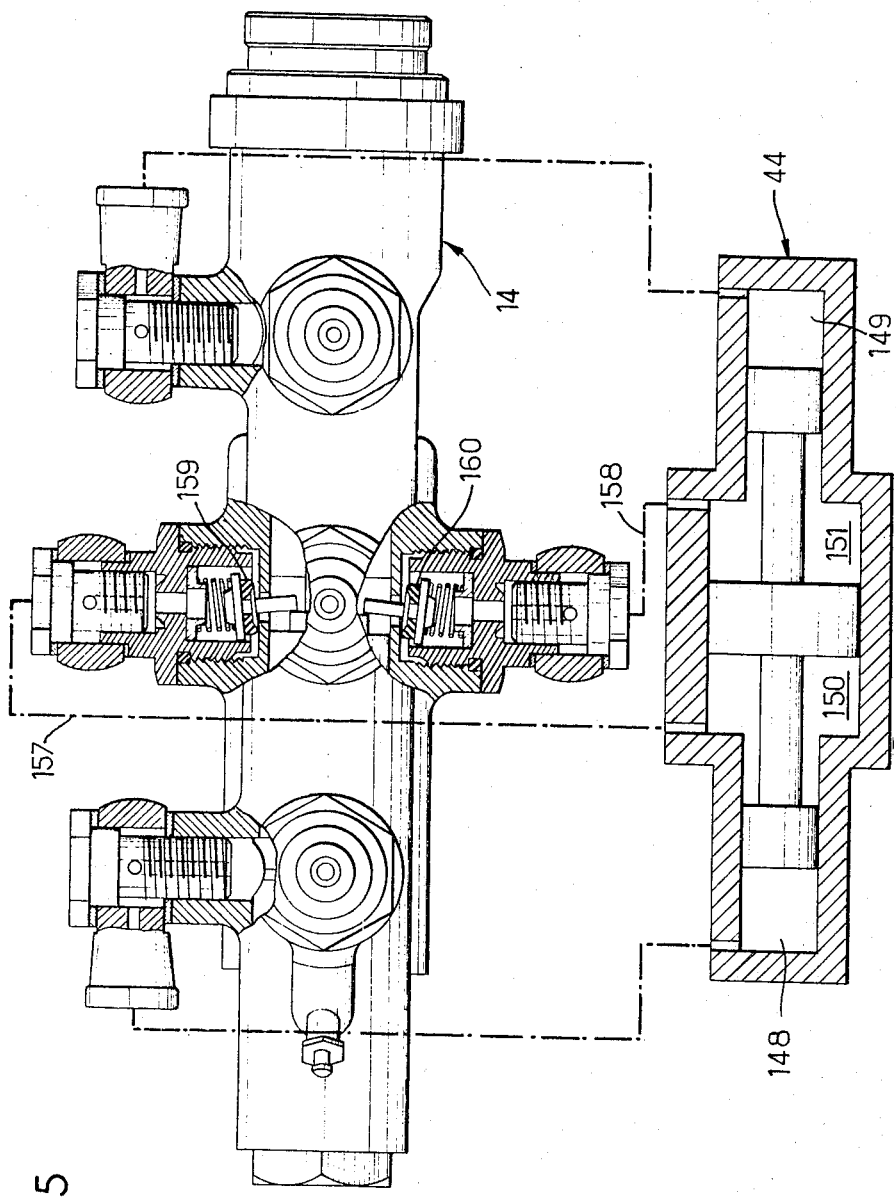

United States Patent Office 3,305,051
Patented Feb. 21, 1967

3,305,051
BRAKING DEVICE, ESPECIALLY FOR
AUTOMOTIVE VEHICLES
Jean Maurice, Paris, France, assignor to Societe Anonyme Francaise du Ferodo, Paris, France, a corporation of France
Filed Jan. 13, 1965, Ser. No. 425,132
Claims priority, application France, Jan. 23, 1964, 961,266; June 22, 1964, 979,124
22 Claims. (Cl. 188—152)

The present invention has for its object a hydraulic braking device for the two wheels of an axle of an automotive vehicle, in which each wheel brake has an actuating chamber determining the expansion of actuating means for the brake and a reaction chamber absorbing the braking reaction, this device comprising a control for driving equal or proportional volumes of fluid into the two actuating chambers, balancing means acting between the two reaction chambers, two modulation chambers which vary in volume at the same time as the reaction chambers, and coupling means between the modulation chambers and the actuation chambers. By virtue of this arrangement an excellent balancing of the braking on the two wheels of the axle is obtained.

The objects, characteristics and advantages of the invention will further be brought out from the description which follows below of forms of construction chosen by way of example, reference being made to the accompanying drawings, in which:

FIG. 1 is a diagram of a braking installation in accordance with the invention;

FIG. 2 is a detailed view of a front wheel brake-cylinder;

FIGS. 3 and 4 are views similar to FIG. 2, but relating respectively to two alternative forms of front wheel brake-cylinder;

FIGS. 5, 6, 7, 8 and 9 are diagrams similar to that of FIG. 1 but relating respectively to five alternative forms of braking installation;

Figure 11:
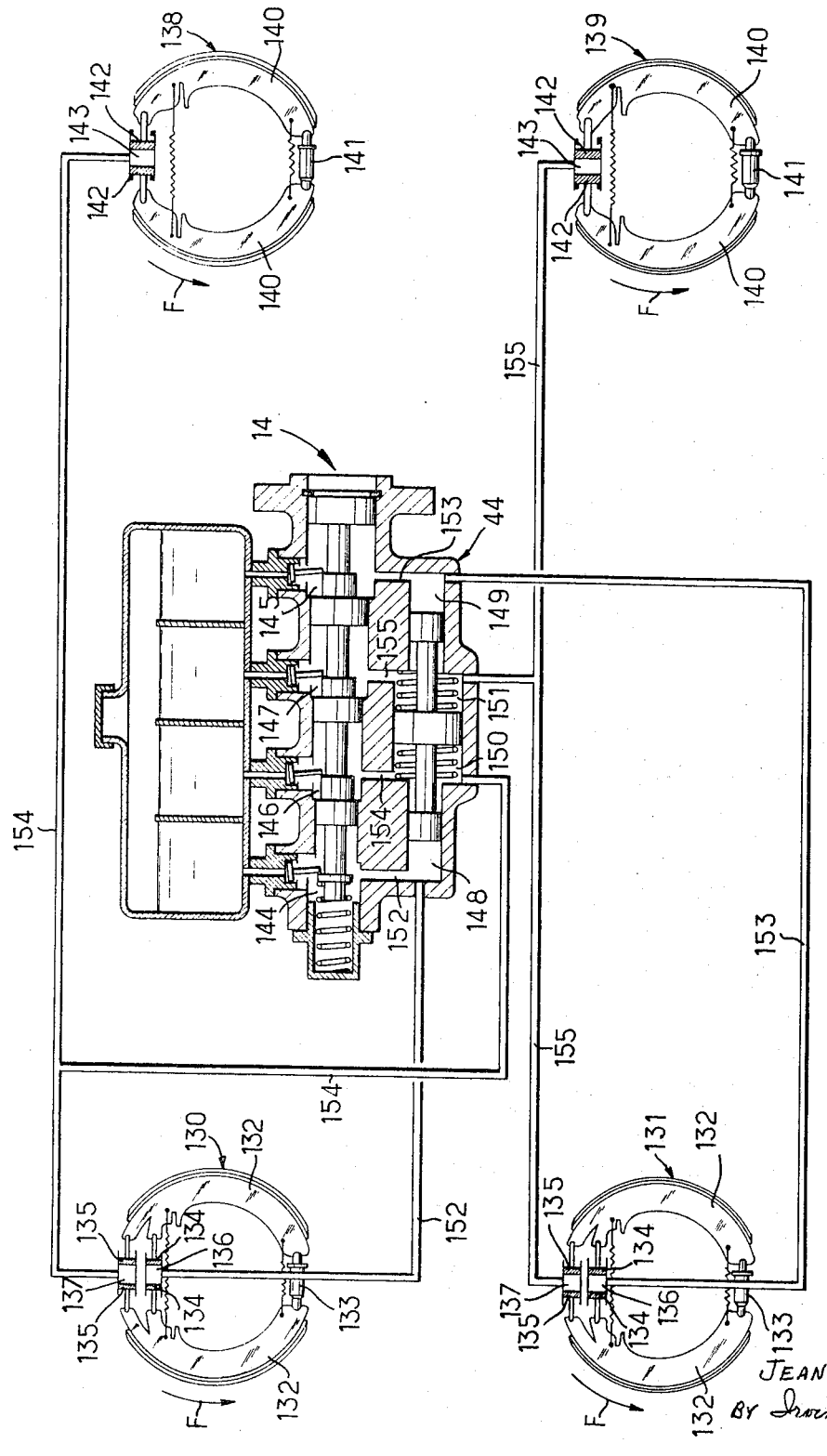
Figure 12:
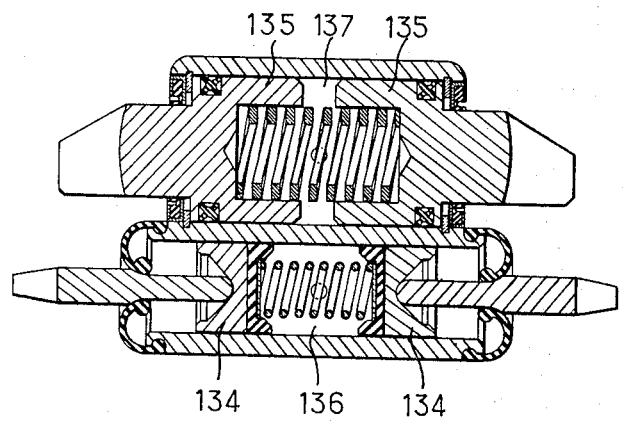
Figure 13:
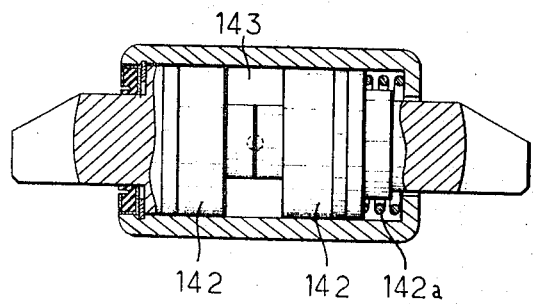

FIG. 10 concerns an alternative form of master-cylinder;

FIG. 11 relates to a further alternative form of braking installation, in which the brakes have a symmetrical operation in forward running and in reverse running;

FIG. 12 is a view in cross-section of a front brake of the installation of FIG. 11;

FIG. 13 is a view in cross-section of a rear brake of the installation of FIG. 11;

FIG. 14 concerns an alternative form of master-cylinder for an installation similar to that of FIG. 11;

FIG. 15 is a view of this master-cylinder with parts in section taken along the line XV—XV of FIG. 14.

Reference will first be made to the diagram of FIG. 1, which relates to an application of the invention to the braking of an automotive vehicle having two front brakes 10 and 11 and two rear brakes 12 and 13. The arrows F indicate the direction of rotation for forward running.

The master-cylinder 14 comprises two bores in line, a front bore 15 and a rear bore 16 of larger diameter, in which slide respectively the pistons 17 and 18 of a master-piston 19 actuated by a pedal 20.

At the front of the piston 17 is formed a primary operating chamber 21, while between the pistons 17 and 18 is formed another primary operating chamber 22. The chambers 21 and 22 are connected respectively to compartments 23 and 24 of an oil tank through the intermediary of clapper valves 25 and 26 co-operating in a rocking motion with the master-piston 19, in such manner that the valves 25 and 26 are half open when the pedal 20 is released and that they close as soon as the pedal 20 is depressed.

The chambers 21 and 22 respectively supply two primary conduits 27 and 28 connected to the front brakes 10 and 11. The master-cylinder 14 is arranged in such manner that when the master-piston 19 is pushed-in under the action of the pedal 20, equal or proportional volumes (equal in the example shown) are expelled from the chambers 21 and 22 into the conduits 27 and 28.

Each front brake 10 and 11 is, in the example shown in FIGS. 1 and 2, of the drum type and comprises (see FIG. 2) a drum 29, a wheel-cylinder 30, and two shoes 31 and 32, in series. The wheel-cylinder 30 is separated into two compartments: a primary compartment 33 in which is located a primary piston 34 acting on the primary shoe 31, and a secondary compartment 35 in which is located a secondary piston 36 acting on the secondary shoe 32.

The primary compartment 33 of the right-hand front brake 10 is connected to the conduit 27, while that of the left-hand front brake 11 is connected to the conduit 28. The respective secondary compartments 35 of the right-hand front brake 10 and of the left-hand front brake 11 are respectively connected to the secondary conduits 37 and 38 (see FIG. 1).

The separation in the wheel cylinder 30 of the compartments 33 and 35 (FIG. 2) is ensured in part by the tail of piston 36 and in part by a separation ring 39. The latter is mounted in the bottom of the secondary bore and is engaged in the primary bore so as to remain effectively mobile on the secondary side.

The two shoes 31 and 32 are subjected to the action of a return spring 40 of U-shape (FIG. 1). The pistons 34 and 36 are centered in their respective bores and come back into abutment against each other under the action of the return spring 40 when the brake is released. The guiding of the primary piston 34 over a sufficient length is ensured by the secondary piston 36 which is itself guided in its turn in the same way by the separation ring 39.

A spring seating 41 mounted on the secondary piston 36 and locked by a circlet 42, keeps under tension a strong centering spring 43, also mounted on the piston 36.

The combined action of the springs 40 and 43 brings back the unit to the position of rest shown in FIG. 2, at the same time permitting the secondary piston 36 to move in both directions on each side of this position.

A balancing arrangement 44 (FIG. 1) is provided and comprises two cylinders 45 and 46, separated by a partition 47. A piston has a piston head 48 slidably mounted in the cylinder 45, while a piston head 49 is slidably mounted in the cylinder 46. The two piston heads 48 and 49 are connected together by a rod 50 which passes through the partition 47 in a sliding fluid-tight manner.

The piston head 48 forms in the cylinder 45 two chambers 51 and 52, while the piston head 49 defines two chambers 53 and 54 in the cylinder 46. It is the chambers 52 and 54 which comprise the rod 50, that is to say which are contiguous to the partition 47. The chambers 52 and 54 constitute modulation chambers.

The chamber 51 is connected by a conduit 55 to the conduit 37. The chamber 52 is connected by a conduit 56 to the conduit 28. The chamber 53 is connected by a conduit 57 to the conduit 38, and the chamber 54 is connected by a conduit 58 to the conduit 27. As an alternative, the connections of the chambers 51 and 54 could be inverted and/or the connections of the chambers 52 and 53 may also be reversed.

The conduits 37 and 55 are connected to a conduit 59 for the operation of the right-hand rear brake 12, while the conduits 38 and 57 are connected to a conduit 60 for the control of the left-hand rear brake 13. Each rear brake is for example of the drum type and comprises two shoes shown diagrammatically at 61 and 62. The shoe 61 is supported against a fixed abutment 63, while the shoe 62 is supported by a piston 64 which is slidably mounted in an actuating cylinder 65. The assembly is orientated so as to be self-releasing for forward running, that is to say the winding of the shoes 61 and 62 controlled by the piston 64 is effected in the opposite direction with respect to the rotation of the drum.

The conduits 59 and 60 are respectively connected to the cylinders 65 of the brakes 12 and 13.

When for the purpose of braking during forward running, the brake pedal 20 is depressed, the master-piston 19 is displaced towards the left of FIG. 1. The chambers 21 and 22 respectively deliver through the conduits 27 and 28 into the primary chambers 33 of the front brakes 10 and 11.

This first part of the operation permits a rapid approach of the shoes 31 and 32 against the drums 29 of the front brakes.

This contact of the shoes tends to carry the shoes away, which has the effect of putting the secondary chambers 35 under high pressures and of keeping the rings 39 applied against the cylinders 30. By virtue of the conduits 37, 55 and 38, 57, these high pressures are transferred into the chambers 51 and 53 separated by the double piston having heads 48, 49 of the balancing device 44. These high pressures are also conveyed by means of the conduits 59 and 60 into the chambers 65 of the rear brakes 12 and 13. The latter are thus permitted to act in an effective manner.

The arrangement which has just been described makes it possible to obtain an excellent balancing of the braking between the front wheels 10 and 11, irrespective of the conditions of working, identical or different, of the two wheels.

In the case where the working conditions would be the same on the two front wheels, for example if it happens that, at the moment of braking, the coefficient of friction of the shoes 31, 32 is exactly the same for the two wheels and that the coefficient of adhesion on the ground is such that neither of the wheels becomes locked, the forces are symmetrical in pairs between the right-hand brake and the left-hand brake, and the two operating pressures at 33 are equal as are also the reaction pressures at 35. The double piston heads 48, 49 of the balancing device 44 then occupy a symmetrical position.

In general, the coefficients of friction will not be exactly the same for the two brakes and may be slightly different from one wheel to the other, while being furthermore variable in more or less considerable proportions.

For example, if at the moment of braking, the coefficient of friction of the shoes 31, 32 of the right-hand brake 10 is higher than that of the shoes 31, 32 of the left-hand brake 11, the secondary piston 36 of the right-hand brake 10 has a tendency to be pushed further in by a small additional amount and, through the intermediary of the conduits 37 and 55 to force the piston head 48 to move down slightly into the cylinder 45. This results in the piston head 48 tending to expel oil from the chamber 52 into the conduit 28 of the primary chamber 33 of the left-hand brake 11, while the piston head 49 tends to increase the reaction pressure at 53, 57, 38, that is to say equally in the left-hand brake 11.

By virtue of this arrangement, an excellent balance of the braking is obtained. In addition, since oil is an incompressible fluid, very large variations of pressure are produced by very small variations of capacity. This permits the double piston heads 48, 49 of the balancing device 44 to occupy a completely stable position of equilibrium which is always very close to the exactly symmetrical position, and this, irrespective of the pressures at 51, 52, 53 and 54.

During reverse running, the reactions of the shoes are reversed in the brakes and no amplified thrust of the secondary shoes now reaches the secondary pistons of the front brakes. The secondary pressures no longer increase as in forward running, and the separation rings 39 of the two front brakes recover their freedom of movement and can move from the secondary side under the effect of the primary pressures.

The primary pressures are equalized and the secondary pressure becomes less than them by reason of the presence of the central spring. The four brakes provide a gripping action in which the reactions are absorbed on fixed points. These are constituted, for the front brakes, by the primary pistons in abutment against the wheel cylinders, and for the rear brakes, on the wheel cylinders themselves.

In the alternative form shown in FIG. 2, the separation between the chambers 33 and 35 is effected, as has been seen, in part by the ring 39 and partly by the tail of the piston 36. In the alternative shown in FIG. 3, this separation is wholly ensured by the ring 39, while in the alternative shown in FIG. 4, the separation is entirely ensured by the tail of the piston 36, the ring 39 being completely eliminated.

These different alternative forms of FIGS. 2, 3 and 4 respectively, are provided in order to permit the adaptation at will in each particular case, of the reaction induced by the primary pressure on the fixed parts of the wheel cylinder during operation in forward running. This reaction, which is zero in the case of FIG. 4, is a maximum in the case of FIG. 3, and can be chosen at any appropriate value in the case of FIG. 2. In fact, the ring 39 remains fast with the fixed parts of the wheel cylinders during normal operation in forward running.

In accordance with other alternative forms of the arrangement according to the invention, the chamber 52 could be connected to the conduit 58 and the chamber 54 to the conduit 56, the remaining chambers being respectively coupled to the conduits 55 and 57; the chamber 53 could be connected to the conduit 55 and the chamber 51 to the conduit 57, the remaining chambers being connected respectively to the conduits 56 and 57. The double piston heads 48, 49 may furthermore be non-symmetrical and may comprise various rods in addition to the rod 50, for the purpose of giving any appropriate modulation effect.

In the alternative form shown in FIG. 5, the arrangement is similar to that which has just been described with reference to FIG. 1, but the double piston heads 48, 49 are eliminated and the secondary reaction chambers 35 are directly connected together by a conduit 70.

The piston 36 of the brake 10 comprises a tail 71 which plunges into a modulation chamber 72, which is connected by a conduit 73 to the chamber 33 of the brake 11. Similarly, the piston 36 of the brake 11 comprises a tail 74 which plunges into a modulation chamber 75 which is connected by a conduit 76 to the chamber 33 of the brake 10.

Figure 5:
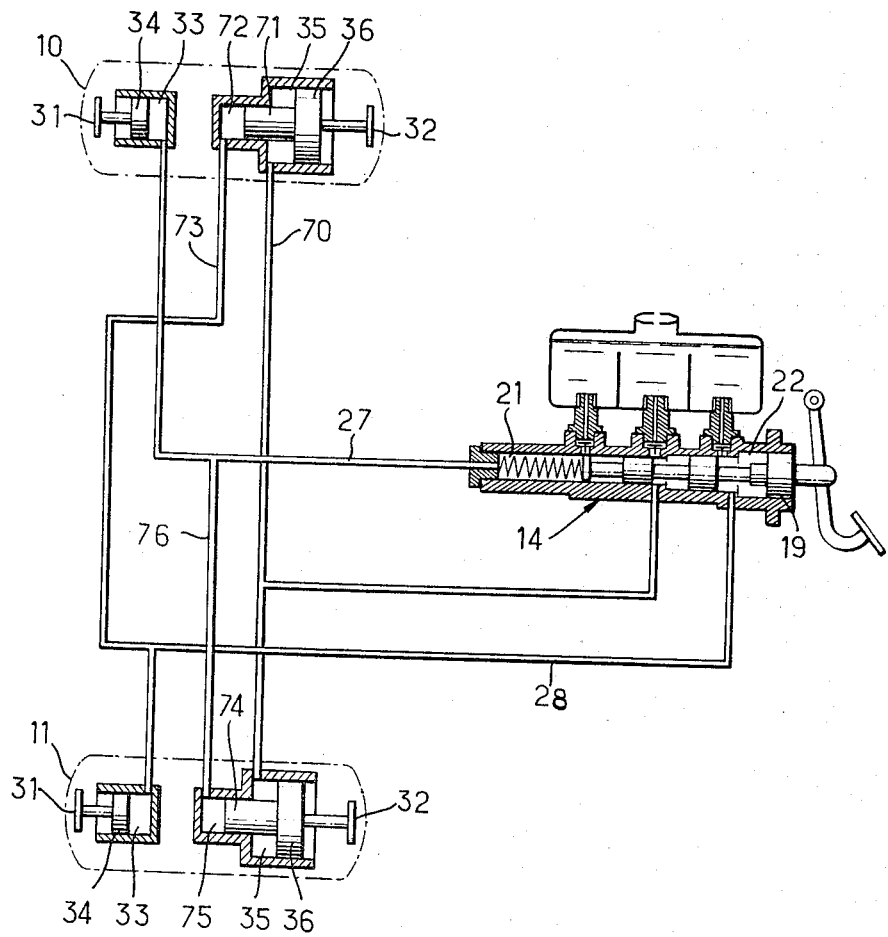

The operation of the device shown in FIG. 5 is similar to that which has been described with reference to FIG. 1.

Figure 6:
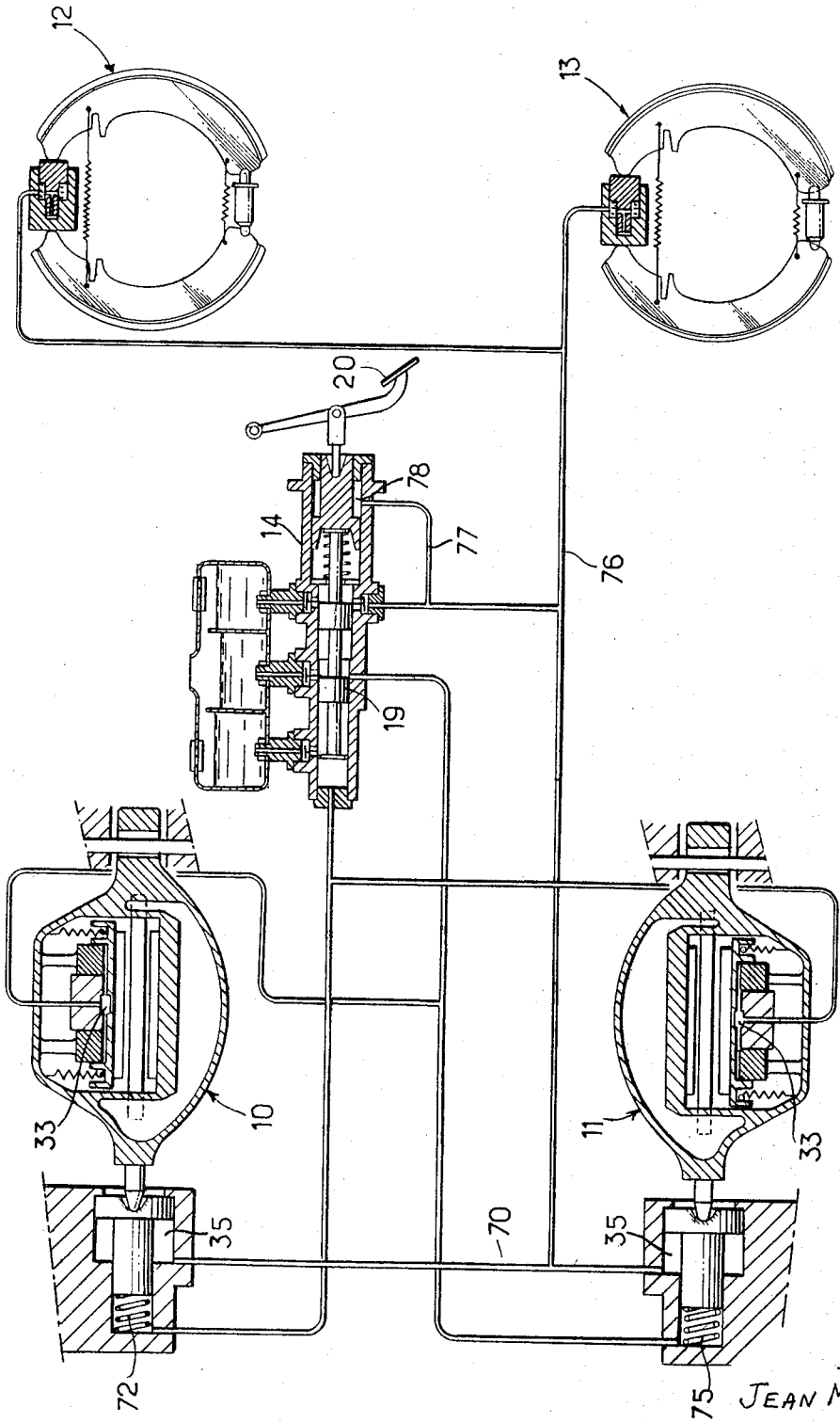

Reference will now be made to FIG. 6 which relates to an application of the arrangement of FIG. 5 to disc brakes. There is again seen at 33 the actuation chambers, at 35 the reaction chambers, and at 72, 75, the modulation chambers. In the example of FIG. 6, the conduit 70 connecting together the reaction chambers 35 is connected by a conduit 76 to the rear brakes 12 and 13, and also by a conduit 77 to an auxiliary chamber 78 of the master-cylinder, enabling the general effectiveness of the device to be increased by introducing a slight self-application effect.

Reference will now be made to FIG. 7, in which the balancing device, referenced by 44a, is incorporated in the master-cylinder 14. The master-piston 19 comprises in this case four piston heads 80, 81, 82, 83, which cooperate with rocking clapper-valves 84 for connection to the compartmented tank 85.

At the front of the piston head 80 is formed a primary chamber 86. Between the piston heads 80 and 81 is formed a secondary chamber 87. Between the piston heads 81 and 82 is arranged another secondary chamber 88, and between the piston heads 82 and 83 is formed another primary chamber 89.

The balancing arrangement 44a comprises four chambers 90, 91, 92, 93, which are respectively coupled to the chambers 86, 87, 88, 89, and which are defined by means of a sliding system comprising a piston having three piston heads 94, 95 and 96. This system is returned to the position of rest by springs 97.

The cylinders 30 of the front brakes 10 and 11 are of the type shown in FIG. 4 and comprise a primary chamber 33 and a secondary chamber 35, while the rear brake cylinders 12 and 13 are of the type shown in FIG. 1 and comprise a chamber 65.

A conduit 98 connects the primary chamber 86, 90 to the chamber 33 of the right-hand front brake 10. A conduit 99 connects the primary capacity 89, 93 to the chamber 33 of the front left-hand brake 11. Conduits 100 connect the secondary capacity 87, 91 to the chamber 35 of the front right-hand brake 10 and to the chamber 65 of the right-hand rear brake 12. Also, conduits 101 connect the secondary capacity 88, 92 to the chamber 35 of the front left-hand brake 11 and the chamber 65 of the rear left-hand brake 13.

The operation is similar to that which has been previously described.

Figure 8:
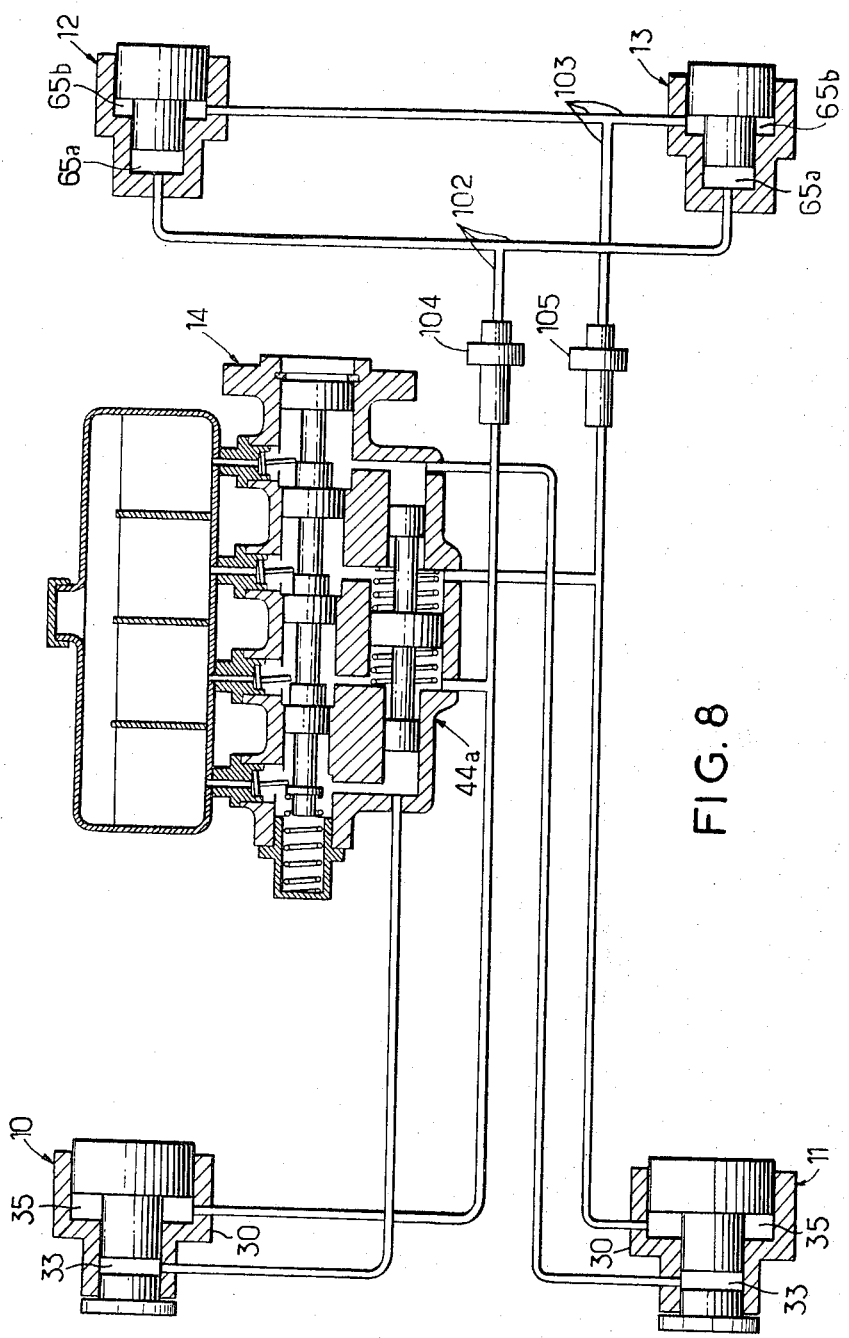

In the example of FIG. 7, each of the rear brakes 12 and 13 is controlled separately by the corresponding front brake 10, 11 in order to follow exactly its conditions of adhesion. It is however possible, as shown in FIG. 8, to operate the rear brakes 12 and 13 by the average of the pressures in the front brakes 10 and 11. In this case, each rear brake 12, 13 comprises two chambers 65a and 65b working in series. The chambers 65a of the brakes 12 and 13 are connected by conduits 102 to the chamber 33 of the front right-hand brake 10, while the chamber 65b of the brakes 12 and 13 are connected by conduits 103 to the chamber 33 of the front left-hand brake 11.

The conduits 102 and 103 may comprise respectively pressure limiters 104 and 105 having different calibrations for the purpose of modulating the pair of rear brakes as a function of the braking pressure, so as to take more fully into account the effect of removal of load to which the rear axle is subjected during the course of braking.

In another alternative form shown in FIG. 9, the arrangement is again similar to that which has been described with reference to FIG. 7, but the front brakes 10 and 11 are in this case of the disc type, while the rear brakes 12 and 13 are of the drum type. The disc brakes 10 and 11 are for example of the type comprising each a rotating disc 110, a pair of brake shoes 111 intended to grip the disc 110 and associated with a plate 112 rotatably mounted coaxially with the disc 110, so that the plate 112 tends to rotate when the shoes 111 are operated to grip the disc 110, two braking cylinders 113 and 114 carried by the plate and intended to effect the gripping of the shoes 111 on the disc 110, and a balancing device interposed between the plate 112 and the fixed frame 115 and comprising the cylinder 116 and piston means 117 which define a chamber 118.

A conduit 119 connects the primary capacity 86, 90 of the master-cylinder 14 with the chamber 113 of the front right-hand brake 10. A conduit 120 connects the primary capacity 89, 93 of the master-cylinder 14 with the chamber 113 of the front left-hand brake 11. Conduits 121 connect the secondary capacity 87, 91 of the master-cylinder 14 with the chambers 114 and 118 of the front right-hand brake 10 and with the chamber 65 of the rear right-hand brake 12. Also, conduits 122 connect the secondary capacity 88, 92 of the master-cylinder 14 with the chambers 114 and 118 of the front left-hand brake 11 and with the chamber 65 of the rear left-hand brake 13.

The operation is similar to that which has been previously described.

The balancing device which is incorporated in the master-cylinder 14 may be shaped as shown at 44a in FIGS. 7, 8 and 9, but it could also be shaped, as has been shown at 44b in FIG. 10, in the manner shown in FIG. 1, that is to say with two piston heads 48 and 49 which are coupled together by a rod 50 passing through a fixed partition 47.

Reference will now be made to FIGS. 11 to 13, which relate to an application of the invention to a braking installation in which the brakes have a symmetrical operation in forward running and in reverse. As shown in FIGS. 11 and 12, each of the front brakes 130 and 131 comprises two shoes 132 coupled together by a moving strap 133 and supported on two pairs of pistons 134 and 135. The pair of pistons 134 forms an action chamber 136, while the pair of pistons 135 defines a reaction chamber 137. Each of the rear brakes 138 and 139 comprises (FIGS. 11 and 13) two shoes 140 coupled together by a movable strap 141 and being supported on a pair of pistons 142 defining a chamber 143, in such manner that, during forward running, the winding of the shoes 140 operated by the right-hand piston 142 (the left-hand piston 142 being in abutment) is effected in the opposite direction with respect to the rotation of the drum, and so that during reverse running, the winding of the shoes 140 operated by the left-hand piston 142 (the right-hand piston 142 coming into abutment) is effected in this case also in the opposite direction with respect to the rotation of the drum, a restoring spring 142a (FIG. 13) giving the assembly a position of rest in which the left-hand piston 142 is an abutment.

The master-cylinder 14 comprises two primary chambers 144 and 145 and two secondary chambers 146 and 147, while the device 44 comprises four chambers 148, 149, 150 and 151.

The chamber 144 of the master-cylinder 14 is connected by conduits 152 to the chamber 136 of the front brake 130 and to the chamber 148 of the balancing device 44. The chamber 145 of the master-cylinder 14 is connected by conduits 153 to the chamber 136 of the front brake 131 and to the chamber 149 of the device 44. The chamber 146 of the master-cylinder 14 is connected by conduits 154 to the chamber 137 of the front brake 130, to the chamber 143 of the rear brake 138 and to the chamber 150 of the device 44. The chamber 147 of the master-cylinder 14 is connected by conduits 155 to the chamber 137 of the front brake 131 to the chamber 143 of the rear brake 139, and to the chamber 151 of the device 44.

The operation is similar to that which has been previously described. The conditions of braking in this case are the same for forward running and for reverse running.

In the alternative form shown in FIGS. 14 and 15, the arrangement is similar to that which has just been described with reference to FIGS. 11 to 13, but the chambers 146 and 147 of the master-cylinder 14 only form a single chamber 156 connected by conduits 157 and 158 respectively to the chambers 150 and 151 of the device 44. The conduits 157 and 158 are provided with non-return valves 159 and 160. As can be seen from FIG. 14, no valve is provided between the chamber 156 and the tank, but a valve of this kind may be provided on condition that the valve 159 or 160 are dispensed with.

It will be understood that the invention is not limited to the forms of construction described and shown, but includes all its alternative forms. For example, instead of associating the front right-hand brake with the rear right-hand brake and the front left-hand brake with the rear left-hand brake, it is possible to associate the front right-hand brake with the rear left-hand brake and the front left-hand brake with the rear right-hand brake, which would come to the same thing as connecting the conduit 100 to the brake 13 and the conduit 101 to the brake 12 in FIG. 7.

What I claim is:

1. In a braking device for the two wheels of an axle of an automotive vehicle, in which each wheel brake has an actuating chamber expansible to actuate the brake and a reaction chamber absorbing the braking reaction, means for driving proportional volumes of fluid into the two actuating chambers, and means for balancing the pressure between the two reaction chambers; the improvement comprising a cylinder, a piston reciprocable in the cylinder and defining with the cylinder four chambers that are separate from each other, a first and second of said four chambers decreasing in size and a third and fourth of said four chambers increasing in size upon movement of the piston in one direction, said first and second chambers increasing in size and said third and fourth chambers decreasing in size upon movement of the piston in the other direction, separate fluid circuits interconnecting the actuating chamber and the reaction chamber of one brake with said first and second chambers respectively, and separate fluid circuits interconnecting the reaction chamber and the actuating chamber of the other brake with said third and fourth chambers respectively, so that upon an increase in pressure in the reaction chamber of said one brake the piston moves in said other direction to increase the pressure in the actuating chamber of said other brake relative to the pressure in the actuating chamber of said one brake, and upon an increase in pressure in the reaction chamber of said other brake the piston moves in said one direction to increase the pressure in the actuating chamber of said one brake relative to the pressure in the actuating chamber of said other brake.

2. A braking device as claimed in claim 1, said volumes of fluid driven into the two actuating chambers being equal.

3. A braking device as claimed in claim 1, said piston having two piston heads and a piston rod interconnecting the two heads, said cylinder having a fixed partition through when said rod slidably passes, two of said four chambers being disposed on one side of said partition on opposite sides of one of said piston heads and the other two of said four chambers being disposed on the other side of said partition on opposite sides of the other of said piston heads.

4. A braking device as claimed in claim 3, the two of said four chambers which are disposed between said two piston heads communicating with the actuating chambers of the brakes and the two of said four chambers which are disposed endwise beyond the piston communicating with the reaction chambers of the brakes.

5. A braking device as claimed in claim 1, said piston having three heads and a piston rod interconnecting the three heads, two of said heads being disposed at opposite ends of the piston and the third of said heads being spaced between said two end heads, two of said four chambers being disposed endwise beyond said two end heads and the other two of said four chambers being disposed between said three piston heads.

6. A braking device as claimed in claim 5, the two of said four chambers that are disposed endwise beyond the piston communicating with the actuating chambers of the brakes and the two of said four chambers that are disposed between said piston heads communicating with the reaction chambers of the brakes.

7. A braking device as claimed in claim 1, said means for driving proportional volumes of fluid comprising a master control cylinder that drives equal volumes of fluid into said actuating chambers.

8. A braking device as claimed in claim 1, said means for driving proportional volumes of fluid comprising a master control cylinder that drives unequal volumes of fluid into said actuating chambers.

9. A device as claimed in claim 1, in which a wheel brake, especially of the drum type, comprises one primary actuating chamber and one secondary reaction chamber, said chambers being defined by means of two pistons and a separation ring.

10. A device as claimed in claim 1, in which a wheel-brake, especially of the drum type, comprises one primary actuating chamber and one secondary reaction chamber, said chambers being defined by means of a separation ring.

11. A device as claimed in claim 9, in which the separation between said two chambers is effected in part by said ring and in part by a piston.

12. A device as claimed in claim 9, in which the separation between said two chambers is ensured by said ring.

13. A device as claimed in claim 9, in which the separation between said two chambers is ensured by a piston.

14. A device as claimed in claim 1, in which a wheel-brake, especially of the disc type, comprises a moving stirrup having the actuating chamber and co-operating with a double cylinder having the reaction chamber and one of said first and fourth chambers.

15. A device as claimed in claim 1, in which a wheel-brake, especially of the disc type, comprises a rotating disc, a pair of brake shoes intended to grip said disc and associated with a plate rotatably mounted coaxially with said disc, two operating cylinders for applying said brake-shoes against said disc, at least one of said cylinders forming an actuating chamber, and means interposed between said plate and a fixed frame, said means comprising a cylinder and a piston which define a reaction chamber.

16. A device as claimed in claim 1, in which said device is applied to one of the axles of an automotive vehicle, and the brakes of another axle of said vehicle are supplied by the reaction pressures of the brakes of said first axle.

17. A device as claimed in claim 1, in which said device is applied to the front axle of the vehicle and the brakes of the rear axle of said vehicle are supplied by the reaction pressures of the brakes of said front axle.

18. A device as claimed in claim 17, in which the right-hand rear brake is supplied with the reaction pressure of the right-hand front brake, and the left-hand rear brake is supplied with the reaction pressure of the left-hand front brake.

19. A device as claimed in claim 17, in which the rear brakes have a double supply, one by reaction pressure from the right-hand front brake, the other by the reaction pressure of the left-hand front brake.

20. A device as claimed in claim 19, in which pressure limiters are arranged respectively in the two supply conduits.

21. A device as claimed in claim 20, in which the settings of said pressure-limiters are different from each other.

22. A device as claimed in claim 1, in which a wheel-brake, especially of the drum type, comprises two shoes coupled together by a movable strap and supported on two pairs of pistons, one of said pairs defining the actuating chamber while the other pair defines the reaction chamber.

References Cited by the Examiner

UNITED STATES PATENTS

| | | | |
|---|---|---|---|
| 3,044,581 | 7/1962 | Leppeletier | 188—152 |
| 3,137,370 | 6/1964 | Leppeletier | 188—152 |
| 3,203,512 | 8/1965 | Leppeletier | 188—152 |

FOREIGN PATENTS 74,608  12/1960  France.

MILTON BUCHLER, *Primary Examiner.*
FERGUS S. MIDDLETON, *Examiner.*
G. E. A. HALVOSA, *Assistant Examiner.*